United States Patent
Nilsson et al.

(10) Patent No.: US 12,064,898 B2
(45) Date of Patent: Aug. 20, 2024

(54) PARTICLES HAVING A SINTERABLE CORE AND A POLYMERIC COATING, USE THEREOF, AND ADDITIVE MANUFACTURING METHOD USING THE SAME

(71) Applicant: Höganäs AB (Publ), Höganäs (SE)

(72) Inventors: Sofia Nilsson, Höganäs (SE); Ragnar Ferrand Drake Del Castillo, Viken (SE); Åsa Ahlin, Höganäs (SE)

(73) Assignee: HÖGANÄS AB (Publ), Höganäs (SE)

( * ) Notice: Subject to any disclaimer, the term of this patent is extended or adjusted under 35 U.S.C. 154(b) by 0 days.

(21) Appl. No.: 16/485,823

(22) PCT Filed: Feb. 9, 2018

(86) PCT No.: PCT/EP2018/053296
§ 371 (c)(1),
(2) Date: Aug. 14, 2019

(87) PCT Pub. No.: WO2018/149748
PCT Pub. Date: Aug. 23, 2018

(65) Prior Publication Data
US 2020/0001359 A1  Jan. 2, 2020

(30) Foreign Application Priority Data
Feb. 16, 2017 (EP) .................... 17156456

(51) Int. Cl.
*B22F 1/102* (2022.01)
*B22F 10/10* (2021.01)
(Continued)

(52) U.S. Cl.
CPC .............. *B28B 1/001* (2013.01); *B22F 1/102* (2022.01); *B22F 10/10* (2021.01); *B33Y 10/00* (2014.12);
(Continued)

(58) Field of Classification Search
None
See application file for complete search history.

(56) References Cited

U.S. PATENT DOCUMENTS

| | | | |
|---|---|---|---|
| 5,749,041 A | 5/1998 | Lakshminarayan et al. |
| 6,048,954 A | 4/2000 | Barlow et al. |

(Continued)

FOREIGN PATENT DOCUMENTS

| | | | |
|---|---|---|---|
| CN | 104858422 A | 8/2015 |
| CN | 106042408 A | 10/2016 |

(Continued)

OTHER PUBLICATIONS

CN104858422 English Machine Translation.*
(Continued)

*Primary Examiner* — Hoa (Holly) Le
(74) *Attorney, Agent, or Firm* — Boone IP Law (57) ABSTRACT

Particles each having a sinterable core and a polymeric coating on at least a part of the core, wherein the polymeric coating includes a polymer that can be removed via decomposition by heat, catalytically or by solvent treatment, and wherein the polymeric coating is present in an amount of 0.10 to 3.00% by weight, relative to the total weight of the particles, as well as the use of these particles in an additive manufacturing process such as a powder bed and inkjet head 3D printing process. The particles and the process are able to provide a green part having improved strength and are thus suitable for the production of delicate structures which require a high green strength in order to minimize the risk of structural damage during green part handling.

18 Claims, 1 Drawing Sheet

(51) Int. Cl.
   *B28B 1/00* (2006.01)
   *B33Y 10/00* (2015.01)
   *B33Y 70/00* (2020.01)
   *C09D 11/037* (2014.01)
   *C09D 11/106* (2014.01)
   *C09D 11/322* (2014.01)

(52) U.S. Cl.
   CPC ............ *B33Y 70/00* (2014.12); *C09D 11/037* (2013.01); *C09D 11/106* (2013.01); *C09D 11/322* (2013.01); *C01P 2004/51* (2013.01); *C01P 2004/61* (2013.01); *Y10T 428/2998* (2015.01)

(56) References Cited

U.S. PATENT DOCUMENTS

| | | | |
|---|---|---|---|
| 10,647,053 B2* | 5/2020 | Erickson | B29C 64/112 |
| 2006/0251535 A1 | 11/2006 | Pfeifer et al. | |
| 2010/0230644 A1 | 9/2010 | Ryoshi et al. | |
| 2013/0105980 A1* | 5/2013 | Yasuda | C22C 9/00 |
| | | | 257/772 |
| 2015/0258734 A1* | 9/2015 | Okamoto | G06K 19/07749 |
| | | | 425/500 |
| 2017/0225396 A1* | 8/2017 | Tom | B33Y 10/00 |
| 2017/0252974 A1 | 9/2017 | Ng et al. | |
| 2019/0224915 A1* | 7/2019 | Hayashi | C08L 25/14 |

FOREIGN PATENT DOCUMENTS

| | | | |
|---|---|---|---|
| EP | 1737646 A1 | 1/2007 | |
| JP | H11-513746 A | 11/1999 | |
| JP | 2004217991 A | 8/2004 | |
| JP | 2007262446 A | 10/2007 | |
| JP | 2016-223005 A | 12/2016 | |
| KR | 20140121018 A | 10/2014 | |
| WO | 2005090055 A1 | 9/2005 | |
| WO | 2009/060803 A1 | 5/2009 | |
| WO | 2016068899 A1 | 5/2016 | |

OTHER PUBLICATIONS

International Search Report (PCT/ISA/210) issued on May 8, 2018, by the European Patent Office as the International Searching Authority for International Application No. PCT/EP2018/053296.

Lakshminarayan et al., "Manufacturing of iron-copper composite parts using selective laser sintering", Advances in Powder Metall, Metal Powder Industries Federation, vol. 3, Jan. 1995, pp. 77-85.

Nelson et al., "Selective Laser Sintering of Polymer-Coated Silicon Carbide Powders", Industrial & Engineering Chemistry Research, American Chemical Society, vol. 34, No. 5, May 1, 1995, pp. 1641-1651.

Written Opinion (PCT/ISA/237) issued on May 8, 2018, by the European Patent Office as the International Searching Authority for International Application No. PCT/EP2018/053296.

Office Action (the First Office Action) issued on Jun. 28, 2021, by the State Intellectual Property Office of the People's Republic of China in corresponding Chinese Patent Application No. 201880025226.3, and an English Translation of the Office Action. (16 pages).

Office Action (Text of the Second Office Action) issued on Jan. 4, 2022, by the State Intellectual Property Office of the People's Republic of China in corresponding Chinese Patent Application No. 201880025226.3 and an English Translation of the Office Action. (10 pages).

Office Action (Notification of Reason for Refusal) issued on Oct. 20, 2021, by the Intellectual Property Office in corresponding Korean Patent Application No. 10-2019-7026742, and an English Translation of the Office Action. (12 pages).

Office Action (Notice of Reasons for Refusal) issued on Nov. 19, 2021, by the Japanese Patent Office in corresponding Japanese Patent Application No. 2019-543978, and an English Translation of the Office Action. (7 pages).

Office Action (Rejection Decision) issued on Sep. 2, 2022, by the Chinese Patent Office in corresponding Chinese Patent Application No. 201880025226.3, and an English Translation of the Office Action. (12 pages).

Office Action (The Third Office Action) issued on Mar. 21, 2022, by the Chinese Patent Office in corresponding Chinese Patent Application No. 201880025226.3, and an English Translation of the Office Action. (11 pages).

* cited by examiner

nsPARTICLES HAVING A SINTERABLE CORE AND A POLYMERIC COATING, USE THEREOF, AND ADDITIVE MANUFACTURING METHOD USING THE SAME

INTRODUCTION

In today's industries the fabrication of complicated geometrical shapes are typically made with the aid of computer aided design, (CAD). With Solid Freeform Fabrication, (SFF) also called rapid prototyping, (RP) one can utilize CAD models to create physical objects through a layer by layer technique, where a highly intricate 3D model becomes segmented into thin 2D slices and thereby feasible to be constructed with the aid of 3D printers.

Manufacturing by 3D printing is one step closer to having finished goods directly from digital data, eliminating time staking and costly tooling. Since it is an additive manufacturing process it does not generate waste as is common in subtractive machining. Various objects can be manufactured from the same stock of powder, little labor and skills are required for multi-part designs, and full creation by digital information reduces risk for human error.

Today, many different manufacturing methods are employed, including Fused Deposition Modelling (FDM), Direct Ink Writing (DIW), Inkjet 3D Printing, Selective Laser Sintering (SLS), Electron Beam Melting (EBM), Selective Laser Melting (SLM), Laminated Object Manufacturing (LOM), Directed Energy Deposition (DED) and Electron Beam Free Form Fabrication (EBF). Each method has its own advantages and disadvantages, in particular with regard to the obtained resolution, the materials that can be employed, manufacturing time, equipment costs, etc.

3D printing takes on where other manufacturing processes fail to deliver. As a layer-by-layer method it is the main technique to successfully produce complex shaped components from a sinterable material, such as metal powder. A particular type of 3D printing is a Powder Bed and Inkjet head 3D printing method (Inkjet printing on a powder bed, hereinafter referred to as 3DP).

Figure 1:
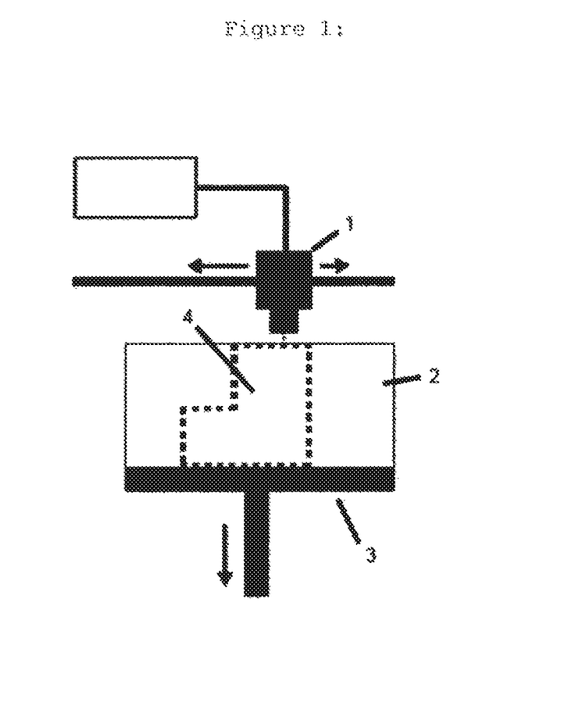

In this method, a powder layer is spread over a build platform. The powder is then selectively covered by a liquid binder composition (also named "ink"), which is ejected from an inkjet head and contains a binder component, which is often a polymer. Typically, heat is applied on the platform in order to evaporate the solvent (typically water or another low temperature-boiling solvent, such as methanol, ethanol, or acetone) in the ink, leaving almost only the binder component. A new powder layer is applied, and the process is repeated. The placement of the binder/ink determines the final geometrical shape of the component, where additionally shrinkage needs to be considered when sintering of the component is needed. When the printing step is finished a drying/curing step is performed in order to evaporate the solvent and let the 3D-printed parts harden into said shape. This process is illustrated in FIG. 1.

Subsequently, excess particles (not bound by the "ink") are removed, e.g. by blowing air or careful removal by hand using a soft brush or similar, and the so-called "green part" is obtained. This green part is then subjected to a step of removing the binder component (so-called "debinding"), which is typically effected by heat treatment leading to thermal decomposition or evaporation of the binder component, leaving the so-called "brown part". Other treatments may also be contemplated, such as catalytic removal or solvent extraction, but removal by heat treatment is preferred. Generally, this is followed by a sintering step in order to fuse the particles' boundaries, giving the final part. This method can be applied to form full-metal parts made from e.g. stainless steel. This technology is already put to market and used for the manufacture of consumer goods, e.g. by Digital Metal AB.

When it comes to printing with the 3DP technique, the stability of the green part is critical when producing delicate structures.

This is due to the fact that for the debinding treatment, the green part must be removed from the 3D printer unit and must be put in e.g. an oven in order to effect thermal debinding. Hence, a high Green Strength (strength of the green part) is required for certain structures.

To make 3DP a better competitive alternative to for example the SLS technique, the Green Strength needs to be increased in order to push the dimension limit to even more delicate structures than what is possible today.

Further, it is desired than an improvement in Green Strength can be obtained without requiring changes to the actual manufacturing process, which is well established. This implies, as one example, that the viscosity of the binder composition/ink can remain unaltered, as an increase or decrease in viscosity are expected to cause problems with currently used inkjet heads and may impair product quality.

PROBLEM TO BE SOLVED

It is an object of the present invention to provide means for increasing the Green Strength of a green part obtained during a 3DP process.

It is a further object of the present invention to provide particles suitable for use in a 3DP process that allow increasing the Green Strength beyond the Green Strength currently obtainable, preferably without requiring further adaptations to the 3DP process.

It is a further object of the present invention to provide particles suitable for use in a 3DP process that allow adjusting the Green Strength of the green part by increasing the amount of binder composition/ink, thereby increasing the versatility of the particles.

It is a further object of the present invention to provide particles suitable for use in a 3DP method that have protection against outer influences and are less prone to surface reactions such as oxidation, without the need for deprotection steps prior to the use of the particles.

It is a further object of the present invention to provide a 3DP manufacturing process allowing to obtain a higher Green Strength of the green part while still allowing to obtain a good quality final product.

SUMMARY OF THE INVENTION

The present invention aims at solving some or all of the above objects and provides the following:

1. Particles each having a sinterable core and a polymeric coating on at least a part of the core,
    wherein the polymeric coating comprises a polymer that can be removed via decomposition by heat, catalytically or by solvent treatment, and wherein the polymeric coating is present in an amount of 0.10 to 10.00% by weight, preferably 0.10 to 5.00% by weight, further preferably 0.10 to 3.00% by weight, relative to the total weight of the particles.
2. Particles according to item 1, wherein the polymer that can be removed via decomposition by heat, catalytically or by solvent treatment is selected from the group of polymer types consisting of polyolefins, poly(meth)
acrylates, polyalkylene oxides, polyurethanes, polyesters, polycarbonates, polyvinyl pyrrolidone, and copolymers and mixtures thereof.
3. Particles according to any one of items 1 and 2, wherein the polymer that can be removed via decomposition by heat, catalytically or by solvent treatment is polyvinyl pyrrolidone having a weight average molecular weight (Mw) of from 1,000-50,000.
4. Particles according to any one of items 1 to 3, wherein the polymeric coating comprises a surfactant, preferably a nonionic surfactant, and/or a wetting agent, which preferably comprises a polyol.
5. Particles according to any one of items 1 to 4, wherein the sinterable core is made of metal, metal alloy, ceramic or cermet.
6. Particles according to any one of items 1 to 5, wherein the sinterable core is made of stainless steel.
7. Particles according to any one of items 1 to 6 having a particle size distribution such that 95% by weight or more of the particles have a diameter of 50 μm or less ($X_{95} \leq 50$ μm).
8. Use of the particles as defined in any one of items 1 to 7 in an additive manufacturing process, in particular a powder bed and inkjet-head 3D printing process.
9. Use according to item 8, wherein a liquid binder composition is used for preliminary binding of the particles, the liquid binder composition comprising a polymer of a polymer type selected from the group consisting of polyolefins, poly(meth)acrylates, polyurethanes, polyesters, polycarbonates, polyvinyl pyrrolidone, and copolymers and mixtures thereof, and wherein the same polymer type is present in the polymeric coating of the particles.
10. A green part obtainable by binding the particles as defined in any one of items 1 to 7 with a binder composition.
11. The green part according to item 10, wherein the binder composition comprises a polymer of a polymer type selected from the group consisting of polyolefins, poly(meth)acrylates, polyurethanes, polyesters, polycarbonates, polyvinyl pyrrolidone, and copolymers and mixtures thereof, and wherein the same polymer type is present in the polymeric coating of the particles.
12. The green part according to item 10 or item 11, which has a Green Strength of 2.7 MPa or more, preferably 3.0 MPa or more.
13. An additive manufacturing method, comprising a step of binding the particles as defined in any one of items 1 to 6 with a binder phase to form a green part, a step of removing the binder phase and the polymeric coating by heat treatment, solvent extraction or catalytically to form a brown part, and a step of sintering the brown part to obtain an object made from a material of the core of the particles.
14. Additive manufacturing method according to item 13, which is a powder bed and inkjet head 3D printing method.

BRIEF DESCRIPTION OF THE DRAWINGS

FIG. 1 shows a schematic representation of a 3DP method. Herein, an inkjet 1 obtains the Wetting Ink/Binder composition (solution) from a reservoir and selectively applies the binder composition/Wetting Ink to a powder bed 2 provided on a build platform 3. Thereby an object/part 4 is formed, wherein the particles of the powder bed are preliminarily bound together by the Wetting Ink.

DEFINITIONS

The following terms will be used in the following detailed description:

The term "polymer" and "polymeric compound" are used synonymously. A polymer or polymeric compound is generally characterized by comprising 5 or more, typically 10 or more repeating units derived from the same monomeric compound/monomer. A polymer or polymeric material generally has a molecular weight of at least 300, typically 1000 or greater. The polymer may be a homopolymer, a random copolymer, a block copolymer or a mixture of any of these, unless reference is made to specific forms thereof. The polymer may be synthesized by any method known in the art, including radical polymerization, cationic polymerization and anionic polymerization.

A monomer in the sense of the present invention is typically a molecule of a chemical species that is capable to react with another molecule of the same chemical species to form a dimer, which then is able to react with a another molecule of the same chemical species to form a trimer, etc., to ultimately form a chain wherein 5 or more, preferably 10 or more repeating units derived from the same chemical species are connected to form a polymer. The group of the monomer molecule capable of reacting with a group of another monomer molecule to form the polymer chain is not particular limited, and examples include an ethylenically unsaturated group, an epoxy group, etc. The monomer may be monofunctional, bifunctional, trifunctional or of higher functionality. Examples of bifunctional monomers include di(meth)acrylates and compounds possessing both a carboxylic acid group and an amide group, and examples of trifunctional monomers include tri(meth)acrylates.

The term "poly(meth)acrylate" is used to jointly denote polymers derived from methacrylic acid, acrylic acid and/or their esters, such as methyl methacrylate or butyl acrylate. The ester residue is preferably a hydrocarbon group having 1 to 20 carbon atoms, more preferably an alkyl group.

The term "weight average molecular weight" denotes the weight average molecular weight determined by a GPC method using polystyrene as standard.

In the present invention, all physical parameters and properties are measured at room temperature (20° C.) and at atmospheric pressure ($10^5$ Pa), unless indicated differently. Further, all values given in % generally relate to % by weight, unless indicated otherwise. Whenever reference is made to a characteristic or property that needs to be determined by a specific test method, the methods mentioned in the Examples can be used. This applies in particular to the measurement of the Green Strength, the amount of polymeric coating, and the particle size.

The term "sinterable" is used to denote inorganic materials that have a melting point of 450° C. or higher, preferably 500° C. or higher, more preferably 600° C. or higher. Sinterable materials in this sense include metals, alloys, ceramics, and glasses having the required melting point. For composites (such as cermet), it would be sufficient if at least some of the material present on the outside of the particle has a melting temperature in the above range, so that the particles may bind to each other during the sintering treatment to form the final sintered body.

As used herein, the indefinite article "a" indicates one as well as more than one and does not necessarily limit its reference noun to the singular, unless this is evident from the context.

The term and/or means that either all or only one of the elements indicated is present. For instance, "a and/or b" denotes "only a", or "only b", or "a and b together". In the case of "only a" the term also covers the possibility that b is absent, i.e. "only a, but not b".

The terms "comprising" and "containing" as used herein are intended to be non-exclusive and open-ended. A composition comprising or containing certain components thus may comprise other components besides the ones listed. However, the term also includes the more restrictive meanings "consisting of" and "consisting essentially of". The term "consisting essentially of" allows for the presence of up to and including 10 weight %, preferably up to and including 5% of materials other than those listed for the respective composition, which other materials may also be completely absent.

The term "Green Strength" used in the present invention relates to the Green Strength of a rectangular test specimen taken from a green part, determined according to the method specified in the Examples section.

DETAILED DESCRIPTION OF THE INVENTION

The present invention is based on the finding that providing a polymeric coating on a part or the entirety of the surface of a sinterable core allows increasing the Green Strength of a green part by increasing the amount of Wetting Ink/liquid binder composition applied during the manufacturing process of the green part. This allows, on the one hand, increasing the Green Strength to levels that could not be obtained with non-coated sinterable particles so far, and, on the other hand, provides particles with which the Strength of a green body can be adjusted simply by varying the amount of binder composition/Wetting Ink. As such, the particles of the present invention are more versatile in this respect as prior art, uncoated particles. Further, the coating may provide at least partial protection against outer influences and surface reactions.

The present invention thus overcomes shortcomings in the prior art, and provides a new way of improving/modifying the Green Strength of a green part. Without the need for changing the actual process for producing the green part. This is favorable from both a technical as well as economic point of view, as existing equipment can be used without any adjustments. Further, existing processes do not need to be adapted, provided adaptation was at all technically feasible.

In this respect, although there have been prior attempts to improve the Green Strength of a green part, the prior art did not succeed in providing such particles and solving the problem of providing means for adjusting/increasing the Green Strength of a green part. Notably, increasing the concentration of polymeric binder in the "ink" was previously not possible, as this would lead to an increase in the viscosity of the binder composition/Wetting Ink to be ejected from the print head, which in turn leads to problems with the inkjet head and impairs the accuracy of the ink deposition, whereas on the other hand the amount of ink could not simply be increased, as higher amounts of binder composition/Wetting Ink could not be absorbed by the sinterable particles.

Further, as is demonstrated in the Examples and Comparative Examples, simply increasing the amount of ink for non-coated particles does not at all lead to an increase in Green Strength, but rather leads to a significant reduction in Green Strength. This problem is solved by the present invention, wherein the sinterable particles are coated fully or at least in part by a polymeric coating composition prior to the use in a 3D manufacturing method such as 3DP where additional binder composition/ink is applied from a print head (see FIG. 1).

The aspects and materials used in the present invention will now be described in more detail:

Sinterable Core

The particles of the present invention have a sinterable core on which a polymeric coating is applied on at least a part of surface of the core. The sinterable particles can be made from any material that is suitably used in a 3D-manufacturing process, and generally an inorganic material is used for the core. The core of the sinterable particles can be made of any metal, metal alloy, glass, ceramic material or a mixture thereof.

Herein, "made of" describes that the particles consist of the metal, metal alloy, glass, ceramic material, or a mixture of these components. Unavoidable impurities may however be present. As such, 95% by weight or more of the core of the sinterable particles consists of a metal, metal alloy, glass, ceramic material, or a mixture thereof, with the remainder being unavoidable impurities. Preferably, at least 98% by weight or more, and more preferable at least 99% by weight or more of the core of the sinterable particles is formed by the metal, metal alloy, glass, ceramic material or a mixture thereof.

The metal that may be comprised in the core of the sinterable particles is not particularly limited, and generally any desirable metal can be used as long as it has the required melting point. Examples thereof include aluminum, titanium, chromium, vanadium, cobalt, iron, copper, nickel, cobalt, tin, bismuth, molybdenum and zinc as well as tungsten, osmium, iridium, platinum, rhenium, gold and silver. Preferred are metal particles of aluminum, iron, copper, nickel, zinc, gold and silver. In one embodiment, the core is made from a metal that is titanium or a titanium alloy, though titanium may due to its tendency to oxidize or form other chemical species (e.g. nitrides) during the subsequent debinding and sintering steps require specific steps for avoiding such a reaction (e.g. low debinding or sintering temperature). Hence, in another embodiment the sinterable core does not comprise titanium or a titanium alloy.

The metal alloy also is not further limited, and generally all kinds of metal alloys can be used as long as they have the required melting point, so that they do not melt at the debinding temperature, but fuse at the sintering temperature employed during the manufacturing process. Preferred alloys are those formed by aluminum, vanadium, chromium, nickel, molybdenum, titanium, iron, copper, gold and silver as well as all kinds of steel. In the steel, the amount of carbon is generally between 0 and 2.06% by weight, between 0 to 20% of chromium, between 0 and 15% of nickel, and optionally up to 5% of molybdenum. The sinterable particles are preferably selected from metals, stainless steel and ceramics, with stainless steel being particularly preferred.

The glass of which the sinterable particles may be formed is not limited, and all types of glass can be used provided that the glass particles fuse at their boundaries at the sintering temperature employed in the process.

The ceramic material also is not limited, as long as its temperature properties allow fusion of the particles at the sintering temperature. Typically, the ceramic materials include alumina, titania, zirconia, metal carbides, metal borides, metal nitrides, metal silicides, metal oxides and ceramic materials formed from clay or clay type sources. Other examples include barium titanate, boron nitride, lead zirconate or lead titanate, silicate aluminum oxynitride, silica carbide, silica nitride, magnesium silicate and titanium carbide.

The metal or metal alloy forming the core of the sinterable particles may be magnetic or non-magnetic.

The sinterable particles may be of any shape, but spherical particles are preferable. This is due to the fact that spherical particles have good flow characteristic and offer high packing density benefiting the strength of the final product.

The particles of the present invention have a polymeric coating on at least a part of the surface of the sinterable core. The coating preferably contains 80% by weight or more, more preferably 90% by weight or more, of a polymer, relative to the total weight of the polymeric coating. In one embodiment, the polymeric coating essentially consists of or consists of a polymer.

The polymeric coating is present in an amount of 0.10 to 10.00% by weight, relative to the total weight of the particles. If the amount is less than 0.10%, it has been found that no significant effect on the capability to modify the Green Strength by increasing the amount of liquid binder can be obtained. If the amount is higher than 10.00% by weight, the shrinkage during the subsequent sintering tends to become large, which might impair the product quality in particular with regard to strength and yield stress. Overall, a high amount of polymeric coating is economically and environmentally unfavorable.

The lower amount of the polymeric coating is 0.10% by weight, but more prominent effects are obtained if the amount is 0.30% by weight or more or 0.50% by weight or more. Thus, preferably, the lower limit of the amount of a polymeric coating is 0.30% by weight or more, more preferably 0.50% by weight or more.

The upper limit of the amount of the polymeric coating is 10.00% by weight, relative to the total weight of the particles. Yet, in order to reduce the influence on shrinkage, it is preferable that the amount is 5.00% by weight or less, more preferably 3.00% by weight or less, further preferably 2.00% by weight or less, still more preferably 1.50% by weight or less.

The polymer present in the polymeric coating is not particularly limited, but is preferably selected from the group of polymer types consisting of polyolefins, poly(meth)acrylates, polyalkylene oxides, polyurethanes, polyesters, polycarbonates, polyvinyl pyrrolidone, and copolymers and mixtures thereof. In principle, any polymer that can be removed by decomposition by heat, catalytically, or by solvent treatment can be used, and polymers that can be removed by heat treatment are preferable. The polymer is thus preferably selected from polyolefins (such as polyethylene or polypropylene), poly(meth)acrylates (such as butyl acrylate, butyl cyanoacrylate, ethyl acrylate etc.), polyalkylene oxides (such as poly(ethyleneoxide), poly(propyleneoxide), and copolymers thereof), polyurethanes and polyvinyl pyrrolidone.

The weight average molecular weight of the polymer is not specifically limited, but it has been found that a relatively low weight average molecular weight (Mw) is beneficial for obtaining the desired balance of properties, such as good adhesiveness and good removability by solvent extraction or heat treatment. As such, the weight average molecular weight of the polymer is preferably 100,000 or less, more preferably 50,000 or less, and particularly preferable between 1,000 and 50,000, with a molecular weight of 5,000 to 30,000 being further preferred. This range of Mw applies to all polymers, but in particular polyvinyl pyrrolidone. Polyvinyl pyrrolidone (PVP) having a molecular weight of 1,000 to 50,000, more preferably 2,500 to 40,000, further preferably 5,000 to 30,000, is thus a preferred polymer for providing the polymeric coating on the surface of the sinterable core of the particles of the present invention. This can be combined with any core material, but is in a preferred embodiment combined with a core made of stainless steel.

The polymeric coating may essentially consist of the polymer, as outlined above. However, it is also possible that additives are present in the polymeric coating. In particular the presence of a surfactant or wetting agent can be beneficial, as this is believed to be able to increase the amount of "ink" that can be absorbed during the production of the green part, which in turn is believed to increase the Green Strength of the green body. The surfactant can be any of anionic, cationic and non-nionic, but is preferably non-ionic. The non-ionic surfactant is preferably a compound or polymer having a (weight average) molecular weight Mw of 1,000 or less, preferably 500 or less, such as Tego Wet 500 used in the Examples, as well as alkylene oxide surfactants of the Pluronic™ series (BASF). The wetting agent is preferably a polyol, such as a sugar alcohol such as sorbitol, or another polyol such asglycerol, ethylene glycol or propylene glycol.

The particle size of the particles of the present invention is not particularly limited, but needs to be suitable for an additive manufacturing process. As such, the particle size is preferably such that 95% by weight or more of the particles have a diameter of 100 µm or less, preferably 72 µm or less, further preferably 50 µm or less, as determined by a light scattering method described in more detail in the Examples section.

Use of the Particles and Manufacturing Method

During the use of the particles for forming a green part, a liquid binder composition ("ink") is used to preliminary bind the particles. The liquid binder composition typically comprises a polymer selected from the same group of polymers as recited above for the polymer in the polymeric coating of the particles of the present invention. Preferably, the polymer present in the liquid binder composition ("ink") is of the same type as the polymer present in the polymeric coating, although this is not a necessity and the polymers may be of different types. An embodiment wherein the polymers are of the same type would for instance be one wherein both the polymer in the polymeric coating and the polymer present in the ink are polyvinyl pyrrolidone, each preferably having a Mw in the range of 1,000-50,000, more preferably 5,000-30,000. This embodiment can be applied to all kinds of sinterable cores, e.g. those made of stainless steel.

Once the green part has been formed by removing excess powder that is not bound by the ink, it is generally necessary to remove the binder composition together with the polymeric coating by a so-called "debinding" treatment. This step is as such known in the art and can be effected by heat treatment, by catalytic decomposition of the polymer in the polymeric coating and the ink (e.g. by using an acid in case of acid-decomposable polymers), or by solvent extraction.

For this reason, it is generally preferable if the polymer present in the polymeric coating and/or the ink is water-soluble or soluble in solvents that are easily removable due to evaporation, such as methanol, ethanol or acetone. Water-soluble polymers are particularly preferred, also in view of the manufacturing process, where water-based "inks" and heating are conducted. As such, preferably one or both of the polymers present in the polymeric coating and/or the "ink" are water-soluble.

The debinding can be conducted thermally. Here, the green part is preferably heated to a temperature in the range of 250 to 500° C. Usually, performing a thermal debinding treatment for 3 to 10 hours is sufficient for removing the polymer and to form the brown part. A good debinding can generally be obtained within 6-8 hours.

Subsequent to the formation of the brown part, it is often desired to sinter the resulting brown part in order to fuse the sinterable particles at their surfaces, to provide strength and integrity to the resulting product. This is typically conducted by slowly heating (e.g. at a heating range of 1 to 5° C./minute) the brown part to a temperature of about 1,000 to 1,500° C. for 10 to 20 hours, followed by cooling at moderate cooling rates (15° C./minute or less).

The present invention will be demonstrated in more detail by way of the following Examples. These are however not intended to limit the scope of the present invention in any way, and the protective scope of the present application is determined solely by the appended claims.

EXAMPLES

Examples 1 to 9 and Comparative Examples 1-3

Preparation of Particles A 990 g of gas atomized stainless steel particles 316L (obtainable from Carpenter under the tradename CarTech® 316L with the nominal composition, in wt.-%, 0.03 C, 2.00 Mn, 0.045 P, 0.030 S, 1.00 Si, 16.00-18.00 Cr, 10.00-14.00 Ni, 2.00-3.00 Mo, balance Fe) were put in a mixing chamber and covered with a lid having an opening for the shaft of an overhead stirrer and an additional opening allowing the addition of liquid.

Separately, a Coating Solution A was prepared by adding 7.5 g of polyvinyl pyrrolidone (PVP) having a weight average molecular weight Mw of 25,000 to 50 ml of a solution of 74.65% water, 12% triethylene glycol, 5% 1,2 hexane diol, 3.25 of nonionic surfactant, 5% of PVP with an Mw of 25,000-30,000 and 0.1% of a Cyan dye. The resulting mixture was stirred to dissolve the PVP in the solution.

After starting the overhead stirrer, the entire Coating Solution A was slowly added via the opening in the lid of the mixing chamber. After stirring for about 5 minutes, the resulting particles to which the Coating Solution A had been added were transferred to a crucible which was then put into an oven. The particles were dried at 200° C. for 3 hours to obtain particles having a sinterable core made of stainless steel which were covered at least in part by a polymeric coating. The dried particles were then ground in order to break up any agglomerates that may have formed. Subsequently, the particles were sieved in order to remove any particles having a size exceeding 71 μm.

Since the Coating Solution A contained 10 g of PVP and the amount of stainless steel particles was 990 g, the aimed amount of PVP was 1% by weight, relative to the total of the particles. Due to losses by transfer to the crucible and liquid remaining on the side walls of the crucible and/or the mixing apparatus, the actual PVP content was lower and determined to 0.68 wt.-% (see Table 1).

Preparation of Particles A'

Particles A' were prepared in the same manner as particles A, except for pre-drying the particles obtained after addition of Coating Solution A for 2 hours at 150° C. before drying at 200° C. for 3 hours.

The resulting particles A' had a lower amount of polymeric coating of 0.51 wt.-% as compared to Particles A, which can be explained by a higher amount of evaporated components of the Coating Solution A during the pre-drying as compared to Particles A.

Preparation of Particles B

Particles B were produced in the same manner as Particles A, except for using the Coating Solution B instead of the Coating Solution A. Coating Solution B is a solution obtained by adding 7.5 g of PVP (Mw=25,000) to 50 ml of a solution of 84.4% water, 10% ethylene glycol, 5% of PVP with an Mw of 15,000, 0.5% of Tego Wet™ 500 (nonionic surfactant, Oxirane 2-methyl-, polymer with oxirane, mono (3,5,5-trimethylhexyl) ether, CAS 204336-40-3) and 0.1% of Acid red dye (CAS 3734-67-6).

The amount of polymeric coating was found to be 0.51 wt.-% (see Table 1).

Preparation of Particles B'

Particles B' were produced in the same manner as Particles A', except for using the above Coating Solution B instead of the Coating Solution A and performing the pre-drying at a temperature of 120° C. instead of 150° C.

The amount of polymeric coating was found to be 0.64 wt.-%, indicating that at 120° C. a crosslinking of the components may occur, thereby reducing the amount of evaporated components during the drying process (see Table 1).

Incidentally, in the present invention the amount of polymeric coating can be determined by STA using a STA 449 F3 Jupiter®, available from Netzsch, following ISO 11357-1: 2016 and 11358-1:2014 using an argon 5.0 atmosphere. Particle sizes can be determined by a laser diffraction method using e.g. a Helos Particle Size Analysis (Sympatec) following SS-ISO 13320-1.

Reference Particles

As Reference Particles, the gas atomized stainless steel particles 316L (obtainable from Carpenter under the tradename CarTech® 316L) were used without any further treatment.

Formation of TRS Bars

TRS-Bars of 30 mm×10 mm (length×width) and roughly 6 mm high were made in a plastic mold with the specified dimensions needed for doing three-point bending tests to evaluate the Green Strength.

After disposing the particles indicated in Table 1 in bar form, the particles were preliminary bound together by manually adding a Wetting Ink A or B (binder composition) as used in a 3DP method, where the binder composition /Wetting Ink is ejected from a inkjet head on a bed of the particles to form a green part. The addition was effected with the aid of a variable volume pipette, (Finnpipette F1 Thermo Scientific). The amount of Wetting Ink for each Example and Comparative Example is indicated in Table 1, as is the composition of the Wetting Inks A and B. These correspond to the solutions to which PVP was added in the preparation of Coating Solutions A and B.

After addition of the Wetting Ink, the bars were dried at 200° C. for 3 h in an oven, and once cooled extracted from the form. Thereafter, Green Strength tests and thermal analysis (STA) for determining the TRS Bar polymer content.

STA was performed as outlined above. The Green Strength was evaluated by the following method:

Determination of Green Strength

The GS is obtained through a transversal rupture strength (TRS), three-point bend test, following ISO 3995:1985.

Figure 2:
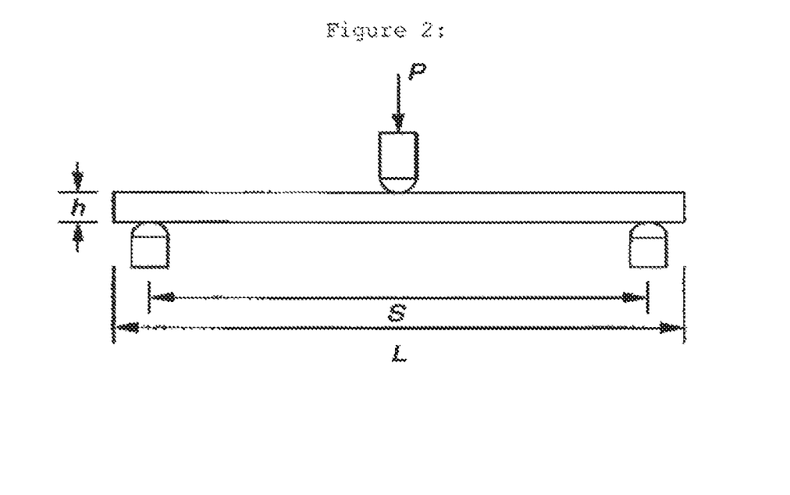
FIG. 2 shows a schematic representation of the experimental setup for determining the Green Strength in a 3-point bending test. Herein, h represents the height of the sample, P represents the force, S represents the distance between the support rollers, and L denotes the length of the test specimen (corresponding to the width for a square test specimen).

The specimen (TRS bar) is placed on two supports with a fixed distance, and then a from above a force is applied on the center of the specimen. The maximum force applied before sample failure is registered as the Green Strength. As the specimen (TRS bar) is rectangular, the formula shown below can be used to obtain the maximum Green Srength:

$$GS = \sigma_f = \frac{3PS}{2bh^2}$$

where the expressions have the following meanings (see also FIG. 2):
  GS : Green Strength (MPa)
  P: Force (N)
  S=length between support rollers (in mm)
  h: height of specimen (in mm)
  b: width of the specimen (in mm) (equivalent to L in FIG. 2 for square test specimen).

In order to determine the Green Strength, the dimensions of the TRS bars were measured. The TRS Bars were afterwards tested in a three-point bending machine, following ISO 3995:1985. The force signal was received by a Force transducer (TH-UM T-Hydronics Inc), and registered by a force indicator (Nobel Elektronik BKI-5). The materials and results are summarized in the following Table 1:

which may lead to surface alterations upon storage of the particles between the production and the 3D-manufacturing process.

An attempt to increase the Green Strength of the green part by increasing the amount of Wetting Ink (binder composition for forming the green part) failed. Rather, the Green Strength was lowered from 2.7 MPa in Comparative Example 1 to 1.7 MPa in Comparative Example 2. This shows that an increase of the Green Strength cannot be obtained for non-coated polymer particles by simply increasing the amount of binder/Wetting Ink. In fact, the Green Strength is significantly lower in Comparative Example 2.

The same result was also obtained when instead another type of Wetting Ink (Wetting Ink B) was used. While the Green Strength is higher as compared to Comparative Example 2, still in Comparative Example 3 the Green Strength is below the Green Strength obtained with a low amount of Wetting Ink (0.63 ml), as obtained in Comparative Example 1. Comparative Examples 2 and 3 thus show that the Green Strength of a non-coated particle cannot be increased by increasing the amount of Wetting Ink, but that instead a decrease of the Green Strength is actually obtained.

Example 1 was performed in the same manner as Comparative Example 1, except that the coated particles A were used. The amount of Wetting Ink was however identical. Example 1 led to a Green Strength of 2.1 MPa, which is sufficient for many applications, e.g. for the preparation of solid structures requiring no extremely high Green Strength.

Example 2 corresponds exactly to Example 1, except that the amount of Wetting Ink was doubled to 1.26 ml. Contrary to the result obtained in Comparative Example 2, however thereby a significant increase of the Green Strength to 3.9 MPa could be obtained. This shows that the particles of the

TABLE 1

| Example | Particles | Coating Solution Type | Amount of polymeric coating (wt. %) | Wetting Ink | Wetting amount (ml) | TRS Bar polymer content (wt %) | Green Strength (MPa) |
|---|---|---|---|---|---|---|---|
| Example 1 | A | A | 0.68 | A | 0.63 | 1.03 | 2.1 |
| Example 2 | A | A | 0.68 | A | 1.26 | 1.29 | 3.9 |
| Example 3 | A | A | 0.68 | B | 0.63 | 0.97 | 1.5 |
| Example 4 | A | A | 0.68 | B | 1.26 | 1.17 | 4.4 |
| Example 5 | B' | B | 0.64 | B | 1.26 | 1.27 | 3.3 |
| Example 6 | A' | A | 0.51 | A | 1.26 | 1.17 | 3.3 |
| Example 7 | A' | A | 0.51 | B | 1.26 | 1.06 | 3.2 |
| Example 8 | B | B | 0.51 | A | 1.26 | 1.22 | 4.3 |
| Example 9 | B | B | 0.51 | B | 1.26 | 0.82 | 4.3 |
| Comparative Ex. 1 | Reference | n.a. | 0 | A | 0.63 | 0.19 | 2.7 |
| Comparative Ex. 2 | Reference | n.a. | 0 | A | 1.26 | 0.41 | 0.7 |
| Comparative Ex. 3 | Reference | n.a. | 0 | B | 1.26 | 0.43 | 1.8 |

Coating Solution Type A: A solution prepared by adding 7.5 g of PVP (Mw = 25,000) to 50 ml of a solution of 74.65% water, 12% triethylene glycol, 5% 1,2 hexane diol, 3.25 of nonionic surfactant, 5% of PVP with an Mw of 25,000-30,000 and 0.1% of a Cyan dye
Coating Solution Type B: A solution prepared by adding 7.5 g of PVP (Mw = 25,000) to 50 ml of a solution of 84.4% water, 10% ethylene glycol, 5% of PVP with an Mw of 15,000, 0.5% of Tego Wet ™ 500 (nonionic surfactant, Oxirane 2-methyl-, polymer with oxirane, mono(3,5,5-trimethylhexyl) ether, CAS 204336-40-3) and 0.1% of Acid red dye (CAS 3734-67-6)
Wetting ink A: 74.65% water, 12% triethylene glycol, 5% 1,2 hexane diol, 3.25 of nonionic surfactant, 5% of PVP with an Mw of 25,000-30,000 and 0.1% of a Cyan dye
Wetting ink B: 84.4% water, 10% ethylene glycol, 5% of PVP with an Mw of 15,000, 0.5% of Tego Wet ™ 500 (nonionic surfactant, Oxirane 2-methyl-, polymer with oxirane, mono(3,5,5-trimethylhexyl) ether, CAS 204336-40-3) and 0.1% of Acid red dye (CAS 3734-67-6)

The following can be derived from the results provided in Table 1:

Comparative Example 1 using the Reference Particles (not surface-coated) leads to a Green Strength of 2.7 MPa. This is sufficient for many applications, but is insufficient in case of thin or delicate structures, as here there is an increasing risk of deformation or breaking of the green part upon removal from the powder bed 3D-printer processing unit. Further, the particles are not protected on their surface, invention are more versatile in that they allow increasing the Green Strength by simply increasing the amount of Wetting Ink, contrary to the non-coated Reference Particles.

The same trend was obtained in Example 3. Here, an amount of Wetting Ink of 0.63 ml led to a Green Strength of 1.5 MPa, which is sufficient for solid objects not requiring a high Green Strength. Again, by increasing the amount of Wetting Ink to 1.26 ml, the Green Strength could be raised to 4.4 MPa. Examples 3 and 4 thus confirm the results of Examples 1 and 2, even if the Wetting Ink A is replaced by Wetting Ink B.

Examples 5 to 9 also confirm the results obtained in Examples 1 to 4 in that an increase of the amount of Wetting Ink leads to a significant increase in Green Strength to at least 3 MPa. Although the reason for this is not clear, a comparison of Examples 4 to 9 reveals that the particles A and B generally lead to a higher Green Strength as compared to the particles A' and B'. The differences between these particles is only that the drying of the coating solution was done with a preliminary drying step at 120 or 150° C. for 2 hours prior to drying at 200° C. for 3 hours. It appears that a rapid drying treatment, without a preliminary drying, leads to a different surface structure, possibly due to crosslinking of the polymer in the coating, which subsequently leads to a higher Green Strength. In this respect, it is noteworthy that the Green Strength obtained in Examples 2, 4, 8 and 9 was 3.9 MPa or higher, whereas in Examples 5, 6 and 7 (using the particles A' or B') the Green Strength was in the order of 3.2 to 3.3 MPa.

Examples 10-13

Polymer Particles C and D were prepared in a similar manner as Polymer Particles A and B, except that the amount of PVP (Mw of 25,000) added to the coating solutions A/B was increased to reach a theoretical PVP content of not 1% by weight (as for Particles A and B), but of 2% by weight. The amount of 316L stainless steel particles was thus reduced to 980 g.

Additionally, the mixing process was altered by using a "Cyclomix high shear impact mixer", (Hosokava Micron B.V.). The mixer has a capacity of around 10 kg, vacuum can be applied during mixing and heating up to 150° C. of the mixing chamber is possible. The rotation speed can be varied between 60-1750 rpm.

For Particles D using coating solution B', not only the amount of PVP was increased as compared to coating solution B, but also surfactant content was increased to 2,50 (Tego Wet), and an additional surfactant was added in an amount of 2.5% (BYK DYNWET™ 800 N, an alcohol alkoxylate).The exact compositions of the coating solutions A' and B' are given below Table 2.

The mixing process began with introducing all of the 316L SS particles into the mixing chamber. Then, vacuum was applied, mixing started at 160 rpm and heating ramped towards 110° C. When reaching 110° C., the mixing and vacuum pump remained active while 20 ml of the premixed coating solution was injected every 5 minutes.

After having injected all the coating solution, the temperature was increased to 150° C. and kept at this temperature for one hour. Subsequently the vacuum and heating was discontinued and the coated particles were poured into an iron/steel crucible that was placed in an oven for drying (3 hours at 200° C.).

The obtained particles were analyzed with respect to their polymer coating content. Further, TRS test bars were prepared (green parts) and tested for their Green Strength and Polymer content, in the same manner as described above for Examples 1-9. The results are summarized in Table 2.

TABLE 2

| Example | Particles | Coating Solution Type | Amount of polymeric coating (wt. %) | Wetting Ink | Wetting amount (ml) | TRS Bar polymer content (wt %) | Green Strength (MPa) |
|---|---|---|---|---|---|---|---|
| Example 10 | C | A' | 1.24 | A | 1.26 | 1.90 | 2.7 |
| Example 11 | C | A' | 1.24 | B | 1.26 | 1.78 | 3.5 |
| Example 12 | D | B' | 1.01 | A | 1.26 | 1.52 | 3.0 |
| Example 13 | D | B' | 1.01 | B | 1.26 | 1.39 | 5.0 |

Coating Solution Type A': A solution prepared by adding 16.25 g of PVP (Mw = 25,000) to 50 ml of a solution of 74.65% water, 12% triethylene glycol, 5% 1,2 hexane diol, 3.25 of nonionic surfactant, 5% of PVP with an Mw of 25,000-30,000 and 0.1% of a Cyan dye
Coating Solution Type B': A solution prepared by adding 16.25 g of PVP (Mw = 25,000) to 50 ml of a solution of 79.9% water, 10% ethylene glycol, 5% of PVP with an Mw of 15,000, 2.5% of Tego Wet ™ 500 (nonionic surfactant, Oxirane 2-methyl-, polymer with oxirane, mono(3,5,5-trimethylhexyl) ether, CAS 204336-40-3), 2.5% of BYK DYNWET 800 N and 0.1% of Acid red dye (CAS 3734-67-6)
Wetting ink A: 74.65% water, 12% triethylene glycol, 5% 1,2 hexane diol, 3.25 of nonionic surfactant, 5% of PVP with an Mw of 25,000-30,000 and 0.1% of a Cyan dye
Wetting ink B: 84.4% water, 10% ethylene glycol, 5% of PVP with an Mw of 15,000, 0.5% of Tego Wet ™ 500 (nonionic surfactant, Oxirane 2-methyl-, polymer with oxirane, mono(3,5,5-trimethylhexyl) ether, CAS 204336-40-3) and 0.1% of Acid red dye (CAS 3734-67-6)

Further tests were conducted in order to evaluate whether the increased amount of polymer in the green parts led to any problems or high porosity in the final object. For this test, cubes of 11×11×7 mm were printed using the 3D printer (Digital Metal P0601) from the Reference Particles using Wetting Ink A indicated in Table 2 (Reference Cube), as well as Particles C using Wetting Ink A (Cube A) and Wetting Ink B (Cube B). The green parts were thermally debound (350° C. for 180 minutes) and sintered (Temperature Profile: temperature increase to 1100° C. at 3° C./minute, holding time of 15 minutes, temperature increase at 3° C./minute to 1360° C., holding time of 120 minutes, temperature decrease at 2° C./minute to 1060° C., holding time of 240 minutes, and temperature decrease at 10° C./minute to room temperature), and the relative density (as compared to bulk stainless steel) was determined.

The Reference Particles (non-coated) achieved a relative density of 97.8%. While the relative density of the test cubes A and B obtained from the particles of the invention was expectedly somewhat lower in view of the increased volume of polymer that may not fully be filled by particle core material during debinding and sintering, nonetheless very good relative densities of 97.3% (Cube A) and 97.5% (Cube B) were obtained.

Further, the average shrinkage during sintering was determined. For the Reference Powder, an average shrinkage of 15% was determined, while the particles of the present invention led to average shrinkages of between 18% (Cube A) and 24% (Cube B). This shows that the increase in Green Strength is accompanied by only small to moderate increases in the shrinkage and small to moderate reductions in the relative density.

The invention claimed is:

1. A powder comprising particles, the particles each having a sinterable core and a polymeric coating on at least a part of the core,
wherein the polymeric coating comprises a polyvinyl pyrrolidone having a weight average molecular weight (Mw) of from 1,000-40,000 g/mol, and wherein the polymeric coating is present in an amount of 0.50 to 5.00% by weight, relative to the total weight of the particles.

2. The powder according to claim 1, wherein the polymeric coating further comprises a surfactant.

3. The powder according to claim 1, wherein the sinterable core is made of metal, metal alloy, ceramic or cermet.

4. The powder according to claim 1, wherein the sinterable core is made of stainless steel.

5. The powder according to claim 1, having a particle size distribution such that 95% by weight or more of the particles have a diameter of 50 μm or less (X95<50 μm).

6. The powder according to claim 1, wherein the polymeric coating further comprises a nonionic surfactant.

7. The powder according to claim 1, wherein the polymeric coating further comprises a wetting agent.

8. The powder according to claim 7, wherein the wetting agent comprises a polyol.

9. The powder according to claim 1, wherein the polymeric coating comprises at least 80% by weight of the polyvinyl pyrrolidone.

10. The powder according to claim 1, wherein the polymeric coating comprises crosslinked polyvinyl pyrrolidone.

11. An additive manufacturing process, wherein the powder as defined in claim 1 are used in the additive manufacturing process.

12. The process according to claim 11, wherein a liquid binder composition is used for preliminary binding of the particles, the liquid binder composition comprising polyvinyl pyrrolidone.

13. A green part obtainable by binding the particles of the powder as defined in claim 1, with a binder composition.

14. The green part according to claim 13, wherein the binder comprises polyvinyl pyrrolidone.

15. The green part according to claim 13, which has a green strength of 2.7 MPa or more.

16. The green part according to claim 13, which has a green strength of 3.0 MPa or more.

17. An additive manufacturing method, comprising a step of binding the particles of the powder as defined in claim 1, with a binder composition to form a green part, a step of removing the binder composition and the polymeric coating by heat treatment, solvent extraction or catalytically to form a brown part, and a step of sintering the brown part to obtain an object made from a material of the core of the particles.

18. Additive manufacturing method according to claim 17, which is a powder bed and inkjet head 3D printing method.

* * * * *